(12) United States Patent
Mittelstadt

(10) Patent No.: US 7,758,125 B2
(45) Date of Patent: Jul. 20, 2010

(54) PORTABLE SUPPORT INCLUDING A PILLOW

(76) Inventor: John Mittelstadt, 20 Val Vista Rd., Mill Valley, CA (US) 94941

( * ) Notice: Subject to any disclaimer, the term of this patent is extended or adjusted under 35 U.S.C. 154(b) by 168 days.

(21) Appl. No.: 12/152,591

(22) Filed: May 15, 2008

(65) Prior Publication Data

US 2009/0206646 A1    Aug. 20, 2009

Related U.S. Application Data

(60) Provisional application No. 60/962,347, filed on Jul. 28, 2007.

(51) Int. Cl.
*A47C 7/62* (2006.01)
(52) U.S. Cl. .................. 297/397; 297/464; 297/487; 5/640; 5/657
(58) Field of Classification Search .............. 297/397, 297/464, 482, 483, 485; 5/640, 657
See application file for complete search history.

(56) References Cited

U.S. PATENT DOCUMENTS

| | | | | |
|---|---|---|---|---|
| 247,823 A * | 10/1881 | Hiller | ......................... | 297/395 |
| 3,608,964 A * | 9/1971 | Earl | ......................... | 297/397 |
| 4,097,086 A * | 6/1978 | Hudson | ................... | 297/217.1 |
| 4,394,783 A * | 7/1983 | Simmons | ................. | 297/230.1 |
| 4,815,154 A * | 3/1989 | Grimes | ........................... | 5/657 |
| 5,317,772 A | 6/1994 | Perl et al. | | |
| 5,345,633 A * | 9/1994 | Harnish | ........................ | 5/639 |
| 5,471,690 A | 12/1995 | McNeil | | |
| 5,544,378 A | 8/1996 | Chow | | |
| 6,017,094 A | 1/2000 | Syiek | | |
| 6,086,152 A * | 7/2000 | Zeller | ...................... | 297/284.5 |
| 6,126,237 A * | 10/2000 | Ritterhouse | ................. | 297/397 |
| 6,394,554 B1 | 5/2002 | Hingle | | |
| 6,484,335 B2 * | 11/2002 | Gilbert | .......................... | 5/636 |
| 6,592,184 B1 | 7/2003 | Segal et al. | | |
| 6,641,221 B1 | 11/2003 | Kastlunger | | |
| 6,684,429 B1 | 2/2004 | Deering | | |
| 6,708,355 B1 | 3/2004 | Wang et al. | | |
| 6,793,287 B2 * | 9/2004 | Dunk | ......................... | 297/397 |
| 6,860,563 B1 * | 3/2005 | Semsch et al. | ............. | 297/397 |
| 6,942,297 B2 | 9/2005 | Johnson | | |
| D522,300 S | 6/2006 | Roberts | | |
| D534,389 S | 1/2007 | Chisholm et al. | | |
| 7,490,909 B1 * | 2/2009 | Haggman et al. | ........... | 297/397 |
| 7,587,773 B2 * | 9/2009 | Littlehorn et al. | .............. | 5/655 |
| 2002/0163240 A1 | 11/2002 | Cheng | | |
| 2007/0056111 A1 | 3/2007 | Lastman | | |
| 2007/0180623 A1 | 8/2007 | Stein et al. | | |
| 2007/0209115 A1 | 9/2007 | Carroll | | |

FOREIGN PATENT DOCUMENTS

GB    2 440 906 A    2/2008

\* cited by examiner

*Primary Examiner*—Peter R. Brown
(74) *Attorney, Agent, or Firm*—Thomas R. Lampe

(57) ABSTRACT

A portable support for providing support for the head of a seated individual includes an elongated pillow having an enlarged upper end portion and a lower pillow end portion. Connector structure is provided to position the larger pillow end portion above the shoulder of a seated individual.

12 Claims, 4 Drawing Sheets

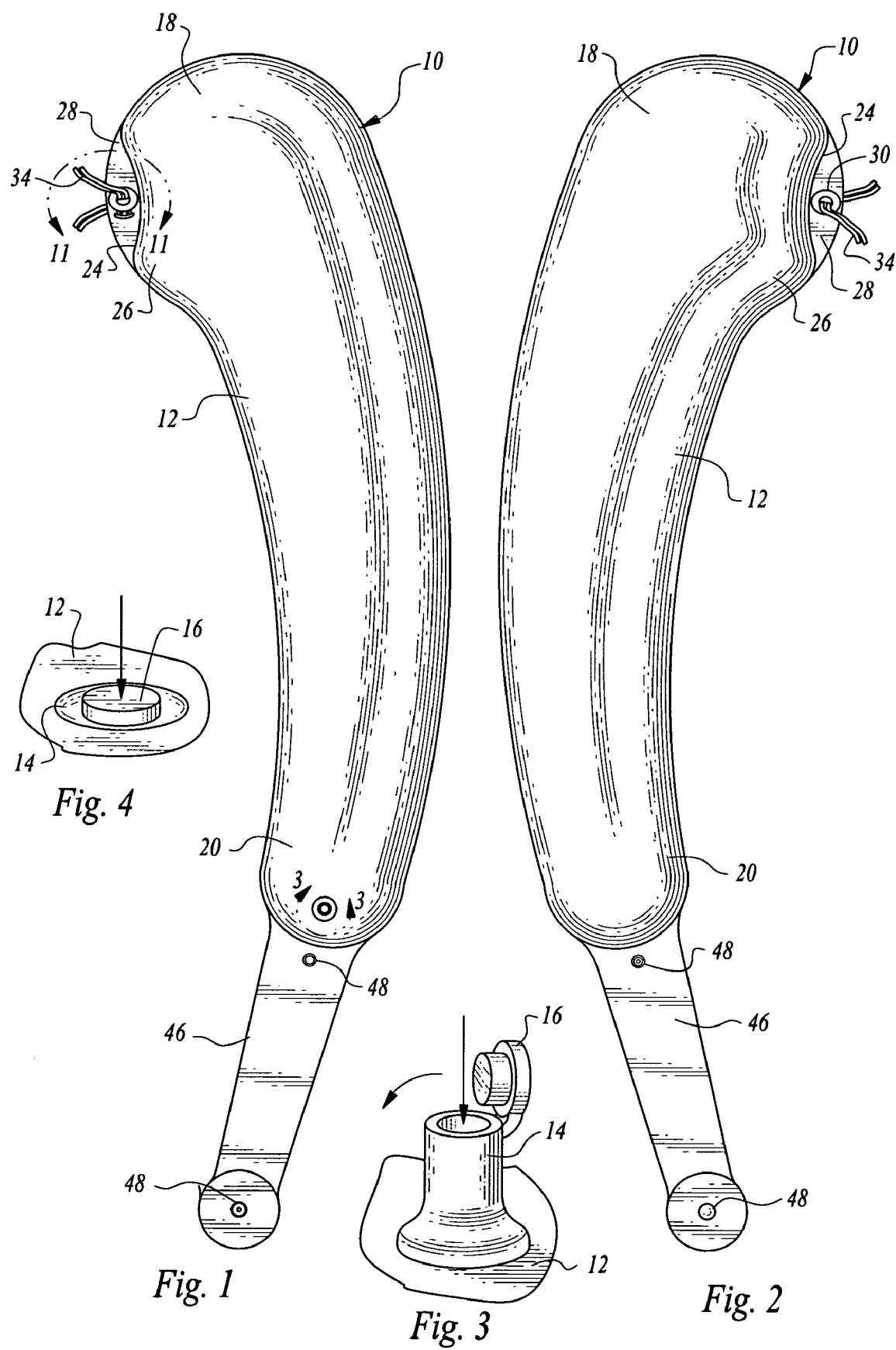

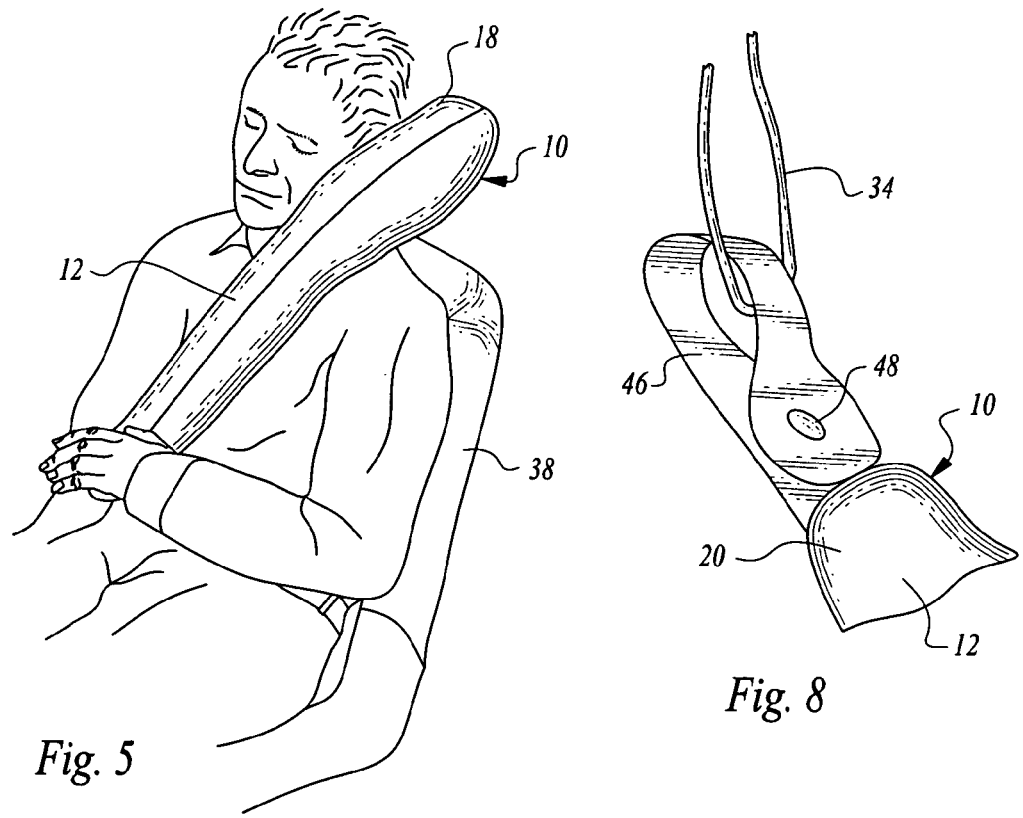
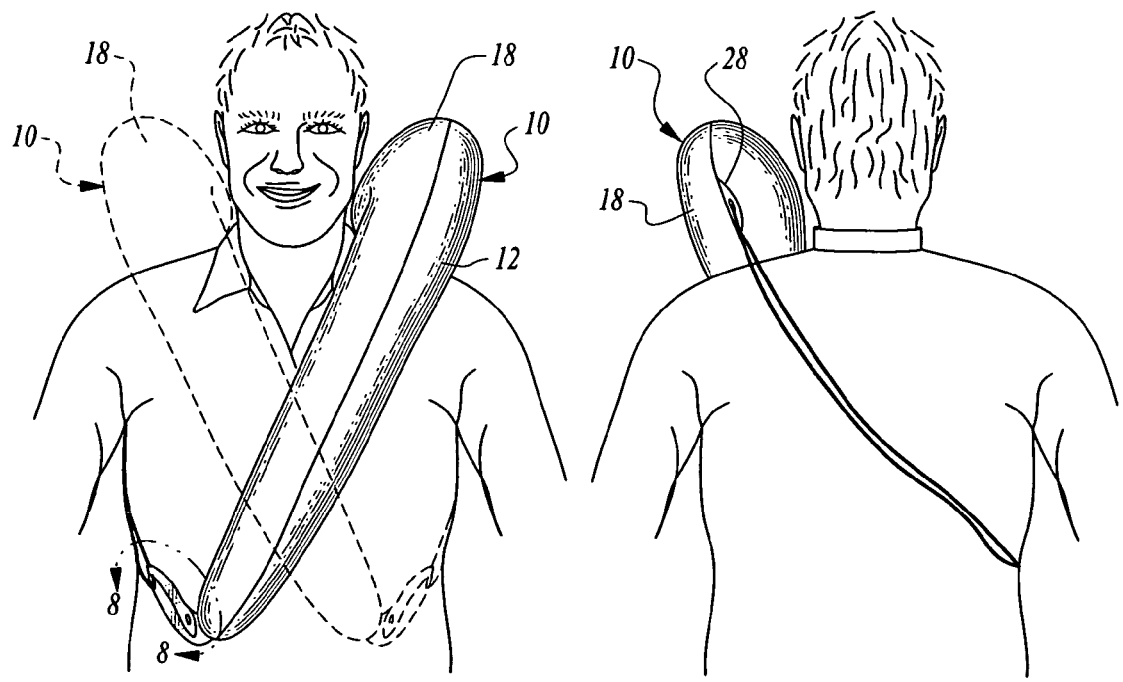
Fig. 5
Fig. 8
Fig. 6
Fig. 7

PORTABLE SUPPORT INCLUDING A PILLOW

This Application is based on and claims the benefit of U.S. Provisional Patent Application Ser. No. 60/962,347, filed Jul. 28, 2007.

TECHNICAL FIELD

This invention relates to a portable support including a pillow for providing support for a seated individual. The support is particularly, although not exclusively, for positioning against the head of a person when traveling on an airplane, train or bus or in an automobile. The portable support is useful in any situation wherein a seated individual wishes to rest his or her head.

BACKGROUND OF THE INVENTION

Portable travel pillows and head rests are known generally. Some of these devices are specifically devised to attach to the backs of seats to provide lateral support for the head of a seated person.

The following patent documents are believed to be representative of the current state of the prior art in this field: U.S. Pat. No. 6,592,184, issued Jul. 15, 2003, U.S. Patent App. Pub. No. US 2002/0163240, published Nov. 7, 2002, U.S. Patent App. Pub. No. US 2007/0056111, published Mar. 15, 2007, U.S. Patent App. Pub. No. US 2007/0180623, published Aug. 9, 2007, U.S. Pat. No. 5,317,772, issued Jun. 7, 1994, U.S. Pat. No. 5,471,690, issued Dec. 5, 1995, U.S. Pat. No. 5,544,378, issued Aug. 13, 1996, U.S. Pat. No. 6,641,221, issued Nov. 4, 2003, U.S. Pat. No. 6,684,429, issued Feb. 3, 2004, U.S. Pat. No. 6,708,355, issued Mar. 23, 2004, U.S. Pat. No. 6,942,297, issued Sep. 13, 2005, U.S. Patent App. Pub. No. US 2007/0209115, published Sep. 13, 2007, U.S. Pat. No. 6,017,094, issued Jan. 25, 2000, U.S. Pat. No. 6,394,554, issued May 28, 2002, U.S. Design Pat. No. D522,300, issued Jun. 6, 2006, U.S. Design Pat. No. D534,389, issued Jan. 2, 2007 and UK Patent App. GB 2 440 906, published Feb. 20, 2008.

DISCLOSURE OF INVENTION

The portable support of the present invention incorporates a number of unique features not taught or suggested by the known prior art and which add to the versatility and ease of use of the portable support. According to one embodiment of the invention, the portable support may alternatively be connected to a seat back to provide the desired support or be worn by the individual to provide the desired support. The portable support is characterized by its relative simplicity and ease of use. Its position relative to a seat and/or to an individual's body may be readily adjusted to provide the desired support for the user's head and upper body.

The portable support includes an elongated pillow having first and second pillow end portions, the first pillow end portion being larger than the second pillow end portion.

First connector structure is attached to the first pillow end portion and second connector structure is attached to the second pillow end portion. In an embodiment of the invention, the first connector structure is for selectively alternatively connecting the first pillow end portion either directly to a seat or to the second connector structure, and the second connector structure is for selectively alternatively connecting the second pillow end portion either directly to a seat or to the first connector structure. As will be seen in greater detail below, these connector structure configurations allow use of the portable support as an attachment to the seat back or alternatively it may be worn or carried by the seated individual and not connected to the seat.

Alternative embodiment of the invention is dedicated to use by a seated individual without attachment to a seat back.

Other features, advantages and objects of the present invention will become apparent with reference to the following description and accompanying drawings.

BRIEF DESCRIPTION OF DRAWINGS

FIG. 1 is a front, elevational view of a portable support constructed in accordance with the teachings of the present invention;

FIG. 2 is a rear, elevational view of the portable support;

FIG. 3 is a greatly enlarged, perspective view illustrating air inlet/outlet structure of the portable support as delineated by double headed arrow 3-3 of FIG. 1;

FIG. 4 is a view similar to FIG. 3, but illustrating a closure of the air-inlet structure in closed condition and an air tube of the structure moved to its non-extended position;

FIG. 5 is a perspective view illustrating the portable support positioned against the head of a seated individual and extending down and across the individual's chest;

FIG. 6 is a front, perspective view illustrating the portable support worn by an individual and shown in two alternate positions, one depicted by solid lines and the other by dash lines;

FIG. 7 is a view taken from the back of the individual shown in FIG. 6, the portable support being shown in its solid line position;

FIG. 8 is a greatly enlarged, perspective view of the portion of the portable support delineated by double headed arrow 8-8 in FIG. 6;

MODES FOR CARRYING OUT THE INVENTION

Figure 9:
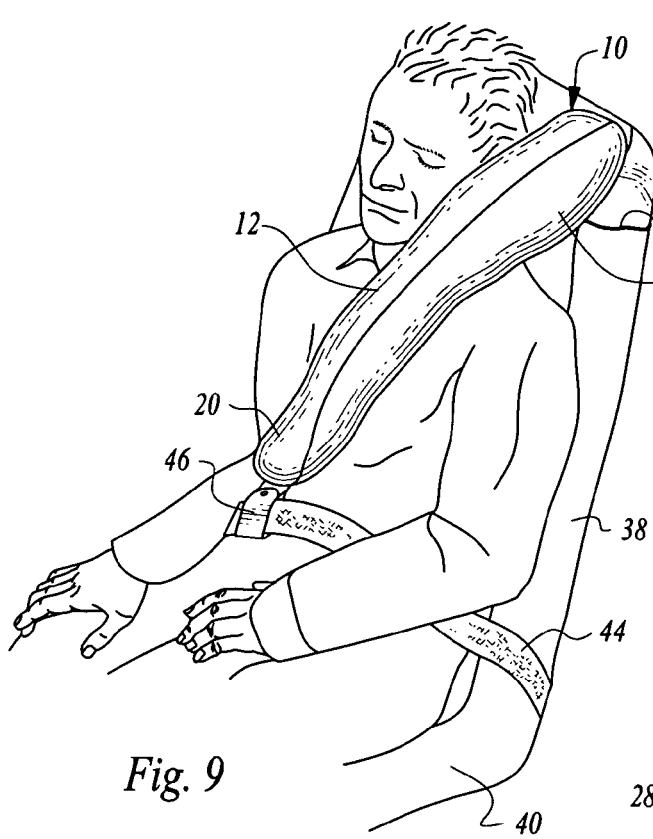
FIG. 9 is a view similar to FIG. 5, but illustrating the portable support directly connected to the back and seatbelt of a seat.

Referring now to FIGS. 1-14, a portable support constructed in accordance with the teachings of the present invention is designated by reference numeral 10. The portable support includes an elongated pillow 12 which in the arrangement illustrated is constructed of flexible material and inflatable from a collapsed condition (shown in FIG. 14, for example) to the inflated condition shown in the rest of the figures. Any suitable conventional means may be utilized to introduce air into the pillow or alternatively allow air to exit the pillow. FIG. 3 shows an air fill/exit tube 14 which may be utilized for such purposes, a closure plug 16 utilized to seal the tube. FIG. 3 shows the air tube in an extended position and the closure plug open and FIG. 4 shows the tube recessed into the pillow and the closure plug sealing the air tube.

The elongated pillow has an upper or first pillow end portion 18 and a lower or second pillow end portion 20. The first pillow end portion is larger than the second pillow end portion, the pillow tapering inwardly in the direction of the second pillow end portion. In addition, the elongated pillow has a curved configuration and the upper or first pillow end portion 18 projects laterally, as shown. Suitably, the overall height (length) of the pillow is in the order of 28 inches for reasons which will be discussed below.

The first pillow end portion defines an inwardly projecting recess 24 at the outer periphery thereof. And more particularly, at an outwardly projecting shoulder engagement lobe 26 of the first pillow end portion.

A flat connector tab 28 is in the recess and a grommet 30 affixed to the connector tab defines an opening 32. See FIG. 11. The opening cooperates with a tether in the form of an adjustable, elongated flexible cord 34 which is doubled over and passes through the grommet opening, as shown in detail in FIG. 11. Unless locked against movement, the cord 34 is slidable in the grommet as shown by the double headed arrows. A lock in the form of a pronged lock member 36 is utilized to selectively engage the cord and prevent movement thereof when pushed into engagement with the cord within opening 32.

Figure 10:
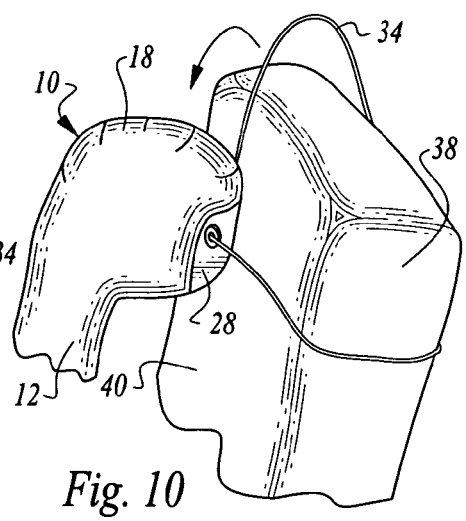
FIG. 10 is a perspective view of portions of the seat back and the portable support, the portable support shown in the process of being attached to the seat back by a tether.
Figure 11:
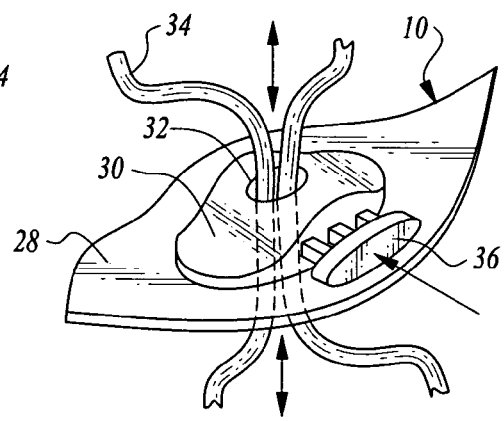
FIG. 11 is a greatly enlarged view illustrating the portion of the portable support delineated by double headed arrow 11-11 in FIG. 1 and showing details of the tether and tether lock.
Figure 13:
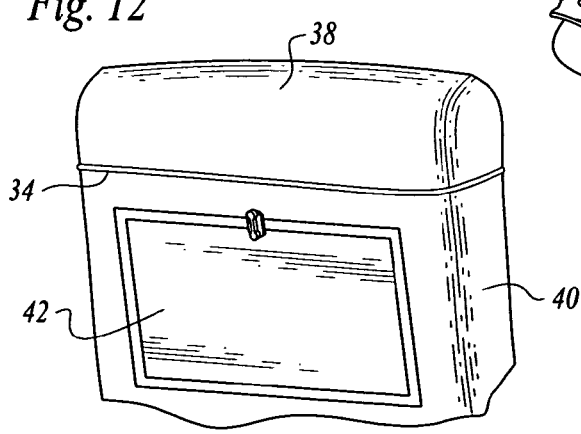
FIG. 13 is a perspective, elevational view of the back of the seat with a flexible tether cord extending thereabout.
Figure 14:
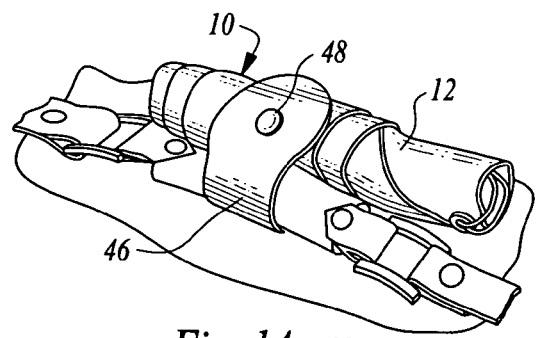
FIG. 14 is a view illustrating the portable support in deflated condition and secured to a piece of luggage by the second connector structure strap.

As shown in FIGS. 9, 10 and 13, the tether cord may be wrapped about the seat back 38 of a seat such as airplane passenger seat 40 to retain the upper pillow head portion 18 in position relative to the seat. The overall height of the inflated pillow of about 28 inches pre-positions the tether cord on an airline seat back so as not to interfere with the fold down tray table 42 (FIG. 13) and any built-in electronics (not shown) mounted in the seat back for the use of the passenger behind. The same 28 inch height matches the approximate height of the average sized person's torso while in a seated position.

As indicated above, the pillow may be slid along the tether cord 34 so that the shoulder engagement lobe 26 can be moved sideways to any desired position on the seat back. FIG. 9 shows the lobe of the upper pillow end portion disposed over and engaging a passenger's left shoulder and the pillow tilted somewhat to the passenger's left when the pillow is engaged by his head. Alternatively, the upper pillow head portion can be slid along the tether cord relative to the seat and positioned over the passenger's right shoulder if he wishes to tilt his head and rest in that direction. The ergonomic shape of the pillow allows secure tethering of the upper portion of the pillow to the seat back while providing a shaped cutaway for a person's shoulder and torso so that the pillow may be positioned along a person's side or across the chest, the latter position being shown in FIG. 5. The feature of connector tab 28 in recess 24 is important since it prevents the grommet, lock member and tether cord from contacting the head and neck of the user, which could cause discomfort.

Figure 12:
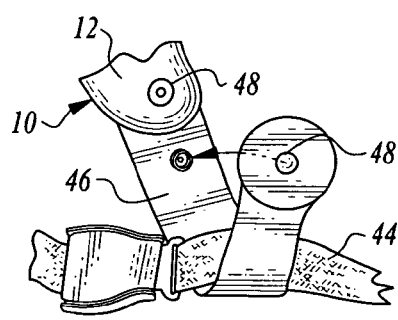
FIG. 12 is a perspective view illustrating a second or lower connector strap being utilized to attach the lower end of the pillow to the seatbelt.

In FIG. 9, second connector structure of the portable support is employed to connect the lower or second pillow end portion to the seat belt 44 comprising part of the seat to connect the lower pillow end portion to the seat. The second connector structure is in the form of a flexible strap 46 which may be wrapped around the seat belt (as shown in FIG. 12) to connect the strap and lower pillow end portion to the seat to maintain the pillow along and in engagement with the user's body. The strap may be slid along the seat belt to adjust positioning of the lower pillow end portion. Preferably the flexible strap has a minimum length of 10 inches. Conventional snap fastener components 48 may be utilized to secure the flexible strap in place about the seat belt and provide additional support while sleeping. In addition, the snap fastener components provide a means for securing and stowing the elongated pillow when it is deflated and rolled up to a luggage handle 50 (FIG. 14) or other objects for convenient storage.

Rather than tether the elongated pillow to a seat back and use the strap 46 to provide an attachment with a seat belt, the flexible cord 34 and the flexible strap 46 may be connected together as shown in FIG. 8. Connecting together the strap 46 and the cord 34 creates a closed loop configuration that enables the portable support to be essentially worn by an individual, as shown in FIGS. 5, 6 and 7. The portable support forms an enclosed space when the cord and flexible strap are connected together, the space being of sufficient size to accommodate an upper body portion of the individual. The portable support surrounds the upper body portion and extends from a location above a shoulder of the individual with the elongated pillow 12 extending downwardly from a location above the shoulder either alongside or across the individual's chest, the latter being shown in FIGS. 5-7. FIG. 6 illustrates with dash lines that the upper or first pillow end portion can be positioned over either shoulder with the lobe 26 in engagement therewith, according to the wishes of the user.

Figure 15:
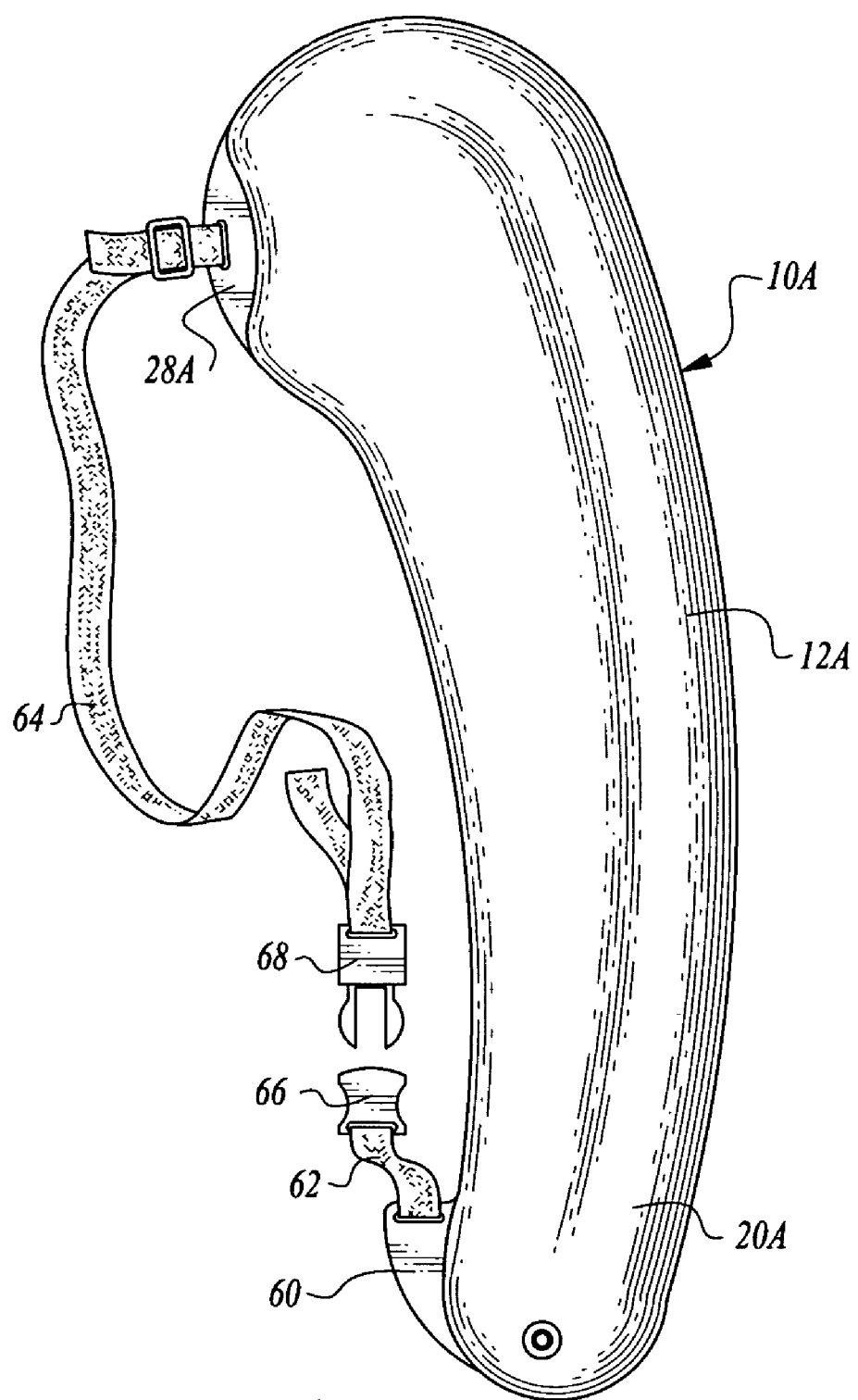
FIG. 15 is a view similar to FIG. 1 of an alternative embodiment of the invention.

FIG. 15 illustrates an alternative embodiment 10A of the invention wherein an elongated pillow 12A incorporates not only a connector tab 28A at the upper pillow end portion, but also a second connector tab 60 extending from the second or lower pillow end portion 20A. A strap portion 62 extends from connector tab 28A and a strap portion 64 extends from connector tab 60. In the arrangement illustrated, the length of strap portion 62 is adjustable. A conventional snap fastener element 66 on strap portion 62 and a conventional snap fastener or buckle element 68 adjustably mounted on strap portion 64 may be utilized to secure the strap portions together. This particular embodiment can be "worn" by an individual and draped from an individual's shoulder to place the support pillow in position to provide a headrest and/or body support.

The pillow and other components of the portable support, such as the connector tab or tabs and the flexible connector strap, can be formed by heat bonding or ultrasonic bonding, for example. Flocked polyvinyl chloride is one suitable material. The pillow could be formed of a laminated fabric material such as used in many air mattresses, if desired. Also, the pillow could be filled with cushioning material of any suitable type.

The above described embodiments are intended to illustrate the principles of the invention, but not to limit its scope. Other embodiments and variations to these embodiments will be apparent to those skilled in the art and may be made without departing from the spirit and scope of the invention.

The invention claimed is:

1. A portable support for supporting the head of a seated individual, said portable support comprising, in combination:
   an elongated pillow having first and second pillow end portions, said first pillow end portion being larger than said second pillow end portion and projecting laterally from said second pillow end portion for positioning over the shoulder of the individual and for engagement by a side of the head of the individual;
   first connector structure attached to said first pillow end portion; and
   second connector structure attached to said second pillow end portion, said first connector structure for selectively alternatively connecting said first pillow end portion either to a seat or to said second connector structure, and said second connector structure for selectively alternatively connecting said second pillow end portion either to a seat or to said first connector structure, said first connector structure including a tether having a flexible, elongated tether element for forming a horizontally disposed loop about the seat back of the seat to connect said first pillow end portion thereto with the first pillow end portion next to a side of the head of the individual and projecting toward the seat back, said tether being adjustable to adjust the size of said loop to tighten or untighten said flexible, elongated tether element relative to the seat back when said elongated tether element forms a horizontally disposed loop about said back seat, and said first connector structure defining an opening adjacent to said first pillow end portion slidably receiving said flexible, elongated tether element enabling said first pillow end portion to be moved along said flexible, elongated tether element relative to said seat and relative to said individual whereby the first pillow end portion may be selectively moved between locations at opposite sides of the individual's head.

2. The portable support according to claim 1 wherein said flexible, elongated tether element comprises a flexible cord.

3. The portable support according to claim 1 wherein said first pillow end portion includes a shoulder engagement lobe and defines an inwardly projecting recess at the outer periphery thereof, said first connector structure additionally including a connector tab in said recess and defining the opening receiving said flexible, elongated tether element to connect said flexible, elongated tether element to said first pillow end portion.

4. The portable support according to claim 3 wherein said elongated pillow has a curved configuration generally conforming to the shape of the shoulder of the individual adjacent to the individual's head and neck.

5. The portable support according to claim 4 wherein said connector tab and said first pillow end portion are pivotable about said flexible, elongated tether element and slidable relative thereto to allow selective alternative placement of said first pillow end portion relative to the seat back and on either side of the individual.

6. The portable support according to claim 1 wherein said second connector structure includes a strap and strap fastener structure for alternatively connecting said strap to a seat belt of the seat or to said flexible, elongated tether element.

7. The portable support according to claim 6 wherein said strap fastener structure includes snap fasteners on said strap.

8. The portable support according to claim 7 wherein said pillow is selectively inflatable or deflatable, said strap being of sufficient length to be wrapped about the pillow when deflated and to attach the deflated pillow to luggage or other object.

9. The portable support according to claim 1 wherein said pillow is of sufficient length to provide lateral support for both the upper body and head of the individual.

10. The portable support according to claim 1 wherein said portable support forms an enclosed space when said first connector structure and said second connector structure are connected together by said flexible, elongated tether element, said space being of sufficient size to accommodate and surround an upper body portion of the individual, and the elongated pillow having sufficient length to extend downwardly from a location above a shoulder of the individual either alongside or across the individual's chest.

11. The portable support according to claim 1 additionally including lock structure for selectively locking said flexible, elongated tether element against adjustment.

12. A portable support for supporting the head of a seated individual, said portable support comprising, in combination:

an elongated pillow having first and second pillow end portions, said first pillow end portion being larger than said second pillow end portion;

first connector structure attached to said first pillow end portion; and second connector structure attached to said second pillow end portion, said first connector structure for selectively alternatively connecting said first pillow end portion either to a seat or to said second connector structure, and said second connector structure for selectively alternatively connecting said second pillow end portion either to a seat or to said first connector structure, said first connector structure including a tether having a flexible, elongated tether element for forming a loop about the seat back of the seat to connect said first pillow end portion thereto, said first pillow end portion including a shoulder engagement lobe and defining an inwardly projecting recess at the outer periphery thereof, said first connector structure additionally including a connector tab in said recess and defining an opening receiving said flexible, elongated tether element to connect said flexible, elongated tether element to said pillow, and a grommet attached to said connector tab defining said opening.

* * * * *